Patented Sept. 4, 1945

2,384,121

UNITED STATES PATENT OFFICE 2,384,121

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application December 27, 1941, Serial No. 424,667

11 Claims. (Cl. 260—78)

This invention relates to a new group of unsaturated esters which are capable of polymerization to products having very desirable properties in the field of synthetic resins and to the polymerization products thereof. In accordance with the present invention, we have prepared diesters of (a) carbonic acid and (b) an ester of an alpha-hydroxy carboxylic acid and an unsaturated alcohol. The alpha-hydroxy substituted monobasic acids are also known as the 1-hydroxy acids and include acids such as lactic acid, glycolic acid, 1-hydroxy-butyric acid, leucinic acid, valerolactinic acid, acetonic acid, and 1-hydroxy-caproic acid.

The invention is particularly related to the compounds derived from unsaturated alcohols containing an unsaturated group in an aliphatic chain and up to ten carbon atoms. Most actively polymerizable materials may be secured from the esters of alcohols containing up to five carbon atoms, including vinyl, propenyl, propynyl, butenyl, butynyl, and pentenyl esters, for example, esters of allyl, isopropenyl, propargyl, crotyl, tiglyl, $\beta$-ethyl-allyl, $\alpha$-ethyl-allyl, methallyl or $\alpha$-methyl-allyl alcohols, or methyl vinyl carbinal, allyl Cellosolve, ethyl vinyl carbinol or the halogen substituted alcohols such as chlorocrotyl, or 2-chloroallyl alcohols. In addition, somewhat less actively polymerizable materials may be secured from ethyl-isopropenyl carbinol, 2,4-hexadienol-1, hexenol-1, linalool, or cinnamyl alcohol.

While the invention includes esters of various unsaturated alcohols it is particularly applicable to esters of unsaturated alcohols wherein the unsaturated group is in an aliphatic chain. Of particular importance are the esters of unsaturated alcohols of low molecular weight.

These new esters have a molecular structure which may be represented by the general formula:

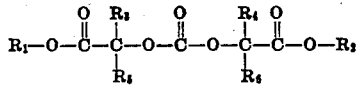

in which $R_1$ and $R_2$ represent the radicals derived from the same or different unsaturated alcohols and $R_3$, $R_4$, $R_5$, and $R_6$ may be hydrogen, hydrocarbon or substituted hydrocarbon radicals depending upon the structure of the hydroxy acid. In the preferred modification, $R_3$ and $R_4$ are hydrogen atoms, $R_1$ and $R_2$ are identical hydrocarbon radicals and $R_5$ and $R_6$ are identical aliphatic hydrocarbon radicals. These symmetrical modifications are of greater importance because the preparation involves fewer operations and the yields are accordingly greater.

The esters may be prepared by reacting esters of the alpha-hydroxy acids and unsaturated alcohols with phosgene. Thus, allyl leucinate, allyl lactate, allyl glycolate, allyl 1-hydroxy-butyrate, allyl valerolactinate, allyl acetonate, allyl 1-hydroxy-caproate or the corresponding esters of other unsaturated alcohols such as vinyl, methallyl, crotyl and others above enumerated may be used. The unsaturated alcohol ester of the alpha-hydroxy acid may be reacted with phosgene in the presence of an alkaline reagent such as pyridine or other cyclic tertiary amine, or the carbonates, oxides, or hydroxides of the alkali metals, alkaline earth metals, or magnesium. The reaction is preferably conducted at a low temperature, for example, 0 to 10° C. or below.

The unsaturated esters described herein are generally high boiling liquids, some of which are capable of being distilled at reduced pressures. Other esters are solid at normal temperatures. Most of the liquid esters are clear, colorless, and miscible with numerous organic solvents such as acetone, alcohol, chloroform, dioxane, benzene, xylene, toluene, ethyl ether paraffin hydrocarbons, etc. The monomeric esters are valuable as plasticizers for various resin materials such as styrene, cellulose, vinyl, urea, protein, phenolic, or acrylic resins. Other uses such as solvents, insecticides, and liquid coating compositions are noteworthy.

These new compounds polymerize in the presence of heat or light or other catalyst to yield solid or liquid compositions of widely differing physical properties. The polymerization is preferably conducted in the presence of catalysts such as oxygen, ozone, or organic peroxides such as lauroyl, benzoyl and acetone peroxides.

The products of polymerization vary greatly in their physical properties, depending upon the molecular structure of the monomer as well as upon the extent of polymerization. In general, the polymers are transparent and colorless and upon complete polymerization a resin which is substantially insoluble and infusible at atmospheric pressure is produced. A range of resins from hard, brittle products to soft, flexible materials are secured. In the ultimate state the polymers are substantially unaffected by acids, alkalies, water, and organic solvents. Intermediate polymers having a wide range of properties may be secured. Upon the initial polymerization of liquid monomers or solutions of the monomers in suitable solvents, an increase in the viscosity of the liquid is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing substantial portions of polymers which are insoluble in the monomer and organic solvents, and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers may be cast polymerized directly to the insoluble, infusible state. This procedure is subject to certain inherent difficulties due to the reduction in volume during the polymerization. The loss of volume or shrinkage causes strains to be established in the hardening gel, which frequently result in fractures as the final hard form is attained. It has been discovered that these difficulties may be avoided by releasing the strains established in the gel. This may be done by interrupting the polymerization at an intermediate stage and permitting the strains to be relieved or by conducting polymerization under conditions which permit gradual release of these strains. For example, the polymerization may be conducted in a simple mold until a soft firm gel has formed. At this point the polymerization may be interrupted and the shaped polymer freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the decomposition of the peroxide catalyst. This temperature is dependent upon the catalyst used. For benzoyl peroxide temperatures of 65 to 80° C. are suitable while for acetone peroxide temperatures of 140–150° C. may be used. The soft sheet of gel is then freed of the mold and in accordance with one modification, the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air or other material which inhibits polymerization in the presence of a peroxide catalyst. Thus, a sheet is produced which is hard and smooth on one side while being soft and tacky on the other. The sheet may then be finished by coating the tacky side with monomer or syrupy polymer and polymerizing it in contact with a smooth plate to the insoluble infusible state. Often it is found desirable to release the polymer from the plate one or more times during polymerization of the coating in order to minimize formation of cracks or other surface defects. Further details of this process may be found in application for Letters Patent, Serial No. 382,111, filed May 6, 1941, by Vincent Meunier, and an application Serial No. 398,241, filed June 16, 1941, by Irving E. Muskat.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, removal from exposure to ultraviolet light, by adding inhibiting materials such as pyrogallol, hydroquinone, aniline, phenylene diamine or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of two to five percent of benzoyl peroxide until the viscosity of the solution has increased about 100 to 500 percent. This may require several hours while heating at 65–85° C. in the presence of benzoyl peroxide. The resulting viscous solution is poured into an equal volume of water, methyl or ethyl alcohol, glycol or other nonsolvent for the fusible polymer. A polymer usually in the form of a powder or a gummy precipitate is thus formed which may be filtered, decanted, or otherwise separated and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be used as molding or coating composition. Due to their solubility they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying a monomer or a syrupy polymer in an aqueous medium with or without a suitable emulsification agent such as polyvinyl alcohol, polyallyl alcohol, polymethallyl alcohol, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of one to five percent of benzoyl peroxide generally in a heated mold. The polymers may be mixed with fillers such as alpha cellulose, wood pulp and other fibrous substances, mineral fillers, or pigments such as zinc oxide or calcium carbonate, lead chromate, magnesium carbonate, calcium silicate, etc., plasticizers such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein, or acrylic resins. It is thus possible to produce transparent, or opaque forms of a wide variety of colors and hardnesses, depending upon the proper selection of the modifying agents.

The fusible polymers may be dissolved in suitable solvents and used as coating and impregnating compositions. For example, the solution or dispersion of fusible polymer in monomer or other organic solvent such as benzene, toluene, chloroform, acetone, dioxane, carbon tetrachloride, phenyl Cellosolve, dichlorethyl ether, dibutyl phthalate, or mixtures thereof, may be useful as a liquid coating composition. Objects of paper, metal, wood, cloth, leather, or synthetic resins may be coated with the solution of polymer in solvent and subsequently polymerized to yield attractively finished coatings. Similarly, porous objects of felt, cloth, leather, paper, etc., either in single layers or laminated may be impregnated with the dissolved fusible polymer and subjected to the polymerization to the final insoluble infusible state.

The following examples are illustrative:

*Example I*

Crotyl glycolate was prepared by direct esterification of crotyl alcohol and glycolic acid. 65 grams of the crotyl glycolate was dissolved in 500 cc. benzene and 85 grams of pyridine. The solution was then treated with phosgene at 0° C. to +10° C. maintained by an ice bath. The ester was washed with water and separated by heating in a vacuum to evolve the solvent and the more volatile impurities.

A five-gram sample was heated at 80° C. for two hours with 3 percent benzoyl peroxide. A colorless glass-like substance was obtained. This monomer was believed to have the constitution:

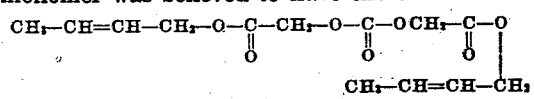

*Example II*

Fifty-two grams of alpha-hydroxy-butyric acid and 29 grams of allyl alcohol were heated for four hours at 40–50° C. in the presence of one-half percent of p-toluenesulphonic acid. The resulting ester was purified by fractional distillation at reduced pressures. The ester was dissolved in 200 cc. of benzene and 100 g. pyridine. The solution was then saturated with phosgene by bubbling the gas through the benzene solution. The reaction mass was maintained at a temperature below +20° C. throughout the reaction. A carbonate ester having the molecular structure

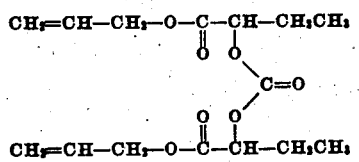

and which was a liquid of high boiling point was formed.

*Example III*

A mixture of 300 cc. of benzene, 66 gms. of leucinic acid, 36 gms. of methallyl alcohol and 0.5 gm. of phenol-sulphonic acid were refluxed for two hours. The reaction vessel was provided with a condenser and separator adapted to separate the water from the benzene. The benzene layer was returned to the reaction vessel. After the reaction was substantially complete, the reaction mass was permitted to cool to room temperature. An excess of pyridine was added and the mixture cooled to 0–5° C. Phosgene was then added until the mixture had taken up about one mole equivalent at which time the reaction ceased. The benzene solution was washed with 100 cc. of water and dried with Na₂SO₄.

The benzene solution was then mixed with 1 percent of benzoyl peroxide and the mixture refluxed for 2 hours. The resulting viscous solution was then poured into 500 cc. of methyl alcohol. A white gelatinous precipitate was formed which was decanted, washed and dried. A five-gram sample of the polymeric gel was pressed in a mold at 150° C. for 1½ hours at a pressure of 1800 pounds per square inch. A clear, light-colored solid product was formed. The monomeric ester was believed to be:

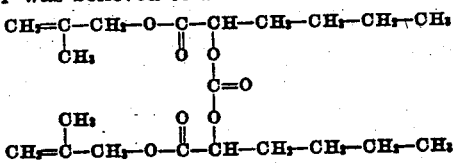

*Example IV*

A portion of the ester produced in Example II was mixed with 5 percent benzoyl peroxide, and heated at 60° C. for one-half hour. A soft solid gel was produced. The material was mixed with 20 percent cellulose pulp in a ball mill. After 16 hours of milling the intimate mixture of the pulverulent materials was pressed in a mold at 120° C. A glossy, white, transparent solid was thereby produced.

*Example V*

A 30 gram portion of the ester produced by the method described in Example II was mixed with 4 per cent benzoyl peroxide and heated at 70 to 80° C. until the viscosity had increased 500 percent. This viscous liquid monomer was poured into a flat-bottomed glass dish with removable sides. This dish was then placed in an oven and heated at 75° C. for three hours. At this time the ester had solidified into a flexible gel with one smooth polymerized surface and one tacky side. The resin was then removed from the glass dish by removing the sides and separating the polymer from the glass bottom. The gel was then placed tacky side down on a glass plate which had previously been coated with the viscous monomer. The gel was then coated on its upper side with another layer of thickened monomer and covered with another glass plate. The gel was then heated at 75° C. for two hours. The sample was cooled and the glass plates removed. A tough transparent resin was produced. After heating at 100° C. for two hours between glass plates the material was hardened greatly.

*Example VI*

The procedure of Example III was used to react crotyl alcohol, leucinic acid and phosgene to prepare an ester believed to have the following constitution:

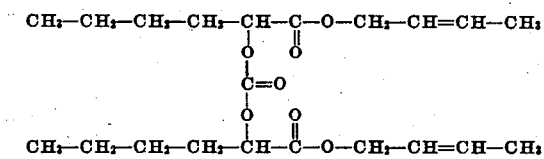

The final completely polymerized ester was a tough, transparent and nearly colorless resin.

*Example VII*

The procedure of Example III was used to react methyllyl alcohol, acetonic acid and phosgene to form the following ester:

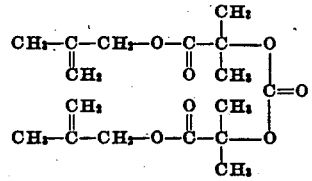

Although the present invention has been described with reference to the specific details of certain embodiments thereof, it is not intended that such details shall be regarded as limitations upon the scope of the invention except insofar as included in the accompanying claims.

The present application is a continuation-in-part of copending application Serial No. 365,103, filed November 9, 1940, and Serial No. 361,280, filed October 15, 1940, by Irving E. Muskat and Franklin Strain.

We claim:

1. A neutral diester of (A) carbonic acid and (B) a monohydroxy ester of (a) an aliphatic monocarboxylic acid having a single hydroxyl group in the alpha carbon atom and (b) a monohydric alcohol having unsaturation in an aliphatic straight chain of up to ten carbon atoms.

2. A polymer of the compound described in claim 1.

3. The compound of claim 1 in which the alpha-hydroxy monocarboxylic acid is alpha-hydroxy-butyric acid.

4. The compound of claim 1 in which the alpha-hydroxy monocarboxylic acid is leucinic acid.

5. The compound of claim 1 in which the alpha-hydroxy monocarboxylic acid is acetonic acid.

6. A diester of (a) carbonic acid and (b) an ester of allyl alcohol and alpha-hydroxy-butyric acid.

7. A diester of (a) carbonic acid and (b) crotyl leucinate.

8. A diester of (a) carbonic acid and (b) an ester of methallyl alcohol and acetonic acid.

9. A polymer of the compound of claim 6.

10. A polymer of the compound of claim 7.

11. A polymer of the compound of claim 8.

IRVING E. MUSKAT.
FRANKLIN STRAIN.